United States Patent [19]

Blomqvist

[11] Patent Number: 5,649,407
[45] Date of Patent: Jul. 22, 1997

[54] APPARATUS FOR SEALING THERMOPLASTIC-COATED PACKAGING MATERIAL

[75] Inventor: Peter Blomqvist, Lund, Sweden

[73] Assignee: Tetra Laval Holdings & Finance S.A., Pully, Switzerland

[21] Appl. No.: 301,394

[22] Filed: Sep. 8, 1994

[30] Foreign Application Priority Data

Sep. 8, 1993 [SE] Sweden .................................. 9302894

[51] Int. Cl.$^6$ ............................................... B65B 51/10
[52] U.S. Cl. .......................... 53/374.8; 53/373.7; 53/551
[58] Field of Search .................. 53/371.2, 371.8, 53/371.9, 373.7, 374.2, 374.8, 374.9, 451, 550, 551, 374.3; 219/243; 493/194, 203, 204, 207, 208, 209, 468, 470; 156/581, 583.1, 583.4, 379.7, 380.2, 380.3, 380.4, 380.6, 530, 290

[56] References Cited

U.S. PATENT DOCUMENTS

| | | | |
|---|---|---|---|
| 2,385,897 | 10/1945 | Waters | 53/551 |
| 2,618,814 | 11/1952 | Paton et al. | 53/575 |
| 3,195,285 | 7/1965 | Toss | 53/374.8 |
| 3,876,486 | 4/1975 | Pennington | 156/581 |
| 4,060,443 | 11/1977 | Balla . | |
| 4,266,389 | 5/1981 | Linde et al. . | |
| 4,384,438 | 5/1983 | Hilmersson . | |
| 4,704,509 | 11/1987 | Hilmersson | 219/10.53 |
| 5,015,223 | 5/1991 | Boeckmann | 156/581 |
| 5,268,058 | 12/1993 | Cornwell | 156/583.1 |
| 5,284,002 | 2/1994 | Fowler | 53/45.1 |

FOREIGN PATENT DOCUMENTS

| | | | |
|---|---|---|---|
| 0 455 907 | 11/1991 | European Pat. Off. . | |
| 1187980 | 2/1965 | Germany | 53/373.7 |
| 451 973 | 11/1987 | Sweden . | |
| WO87/01093 | 2/1987 | WIPO . | |

Primary Examiner—Linda Johnson
Assistant Examiner—John Paradiso
Attorney, Agent, or Firm—Burns, Doane, Swecker & Mathis, L.L.P.

[57] ABSTRACT

An apparatus for sealing a thermoplastic-coated packaging material, the material having at least one layer of a metal foil, includes an inductor having at least three substantially parallel, spaced apart conductors. A method for forming sealed, filled packages and a method for sealing packaging material are also provided.

14 Claims, 1 Drawing Sheet

APPARATUS FOR SEALING THERMOPLASTIC-COATED PACKAGING MATERIAL

TECHNICAL FIELD

The present invention relates to an apparatus for sealing a thermoplastic-coated material, with at least one layer of a metal foil.

BACKGROUND ART

It has long been known in the packaging industry to employ packaging materials comprising outer layers of thermoplastic, these outer layers being capable of being sealed together by fusion after heating and compression for providing tight and durable sealing joints or seams. For example, such a material may be fed in web form through a filling machine and formed into a tube which is longitudinally sealed by means of a lap joint. This material tube is filled with its contemplated contents, whereafter the tube is transversely sealed and severed to form individual packages which, in a later stage, are finally formed, for example into parallelepipedic packages or cartons.

A packaging material including a metal foil, preferably aluminium foil, is ideally employed when the transverse seals are made by so-called induction sealing. An apparatus for such induction sealing is disclosed and described in Swedish Patent Specification SE 451 973. In this instance, an induction current is induced in the aluminium layer of the packaging material, this current heating the thermoplastic layer disposed adjacent the aluminium layer so that the thermoplastic layer can be sealed to a corresponding thermoplastic layer.

The above-described method of transversely sealing packaging blanks as described in the above-disclosed patent specification has, however, proved to be unsuitable for highly viscous products and products containing particles such as kernels, fruit seeds or fibres. According to the above-described method, two substantially parallel transverse seals are made between which the packaging tube is severed to form individual packaging blanks. In this instance, sealing flaps or fins are created which lie outside the transverse seals and where product residues may accumulate. These product residues can, on storage of the package, take on a highly disagreeable and unhealthy appearance.

OBJECT OF THE INVENTION

One object of the present invention is to provide an apparatus for induction sealing which is suitable for use together with products which are highly viscous or which contain particles such as kernels, fruit seeds or fibres and in which the transverse seal of the package is made such that no sealing flaps or fins are created where product residues may gather.

SOLUTION

This and other objects have been attained according to the present invention in that the apparatus of the type described by way of introduction includes three conductors, these being disposed such that the current density in the conductors is approximately equal.

BRIEF DESCRIPTION OF THE ACCOMPANYING DRAWING

One preferred embodiment of the present invention will now be described in greater detail hereinbelow, with particular reference to the accompanying Drawing, in which:

FIG. 1 is a cross sectional through an inductor according to an embodiment of the present invention; and FIG. 2 is a partially cross-sectional view of an apparatus according to an embodiment of the present invention, showing how packaging material is sealed using an inductor according to the present invention.

The Drawings show only those details essential to an understanding of the present invention, the arrangement of the inductor in a filling machine (which is well-known to a person skilled in the art) having been omitted.

DESCRIPTION OF PREFERRED EMBODIMENT

Figure 1:
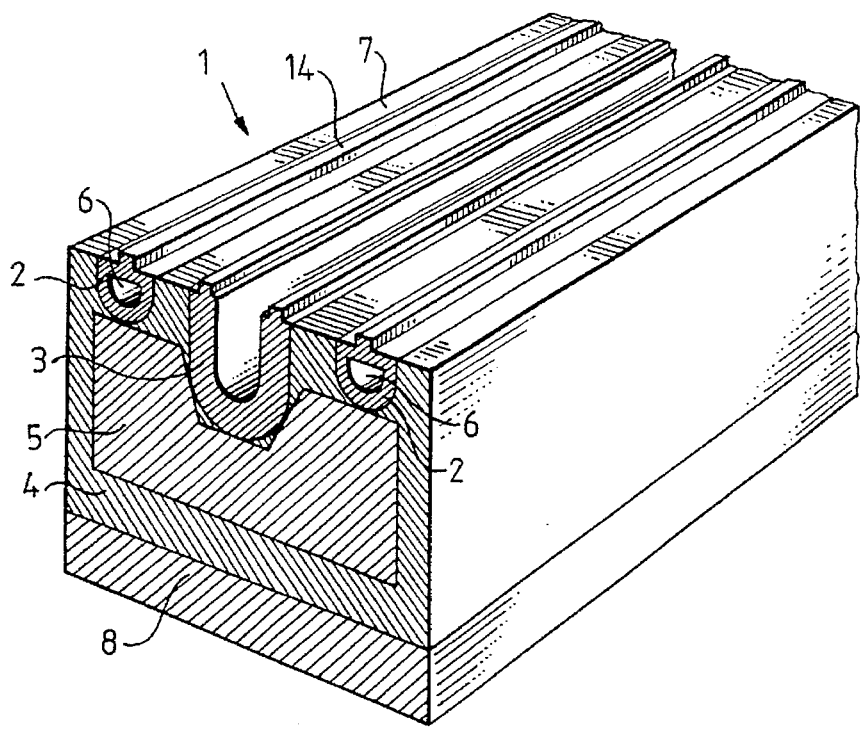
Figure 2:
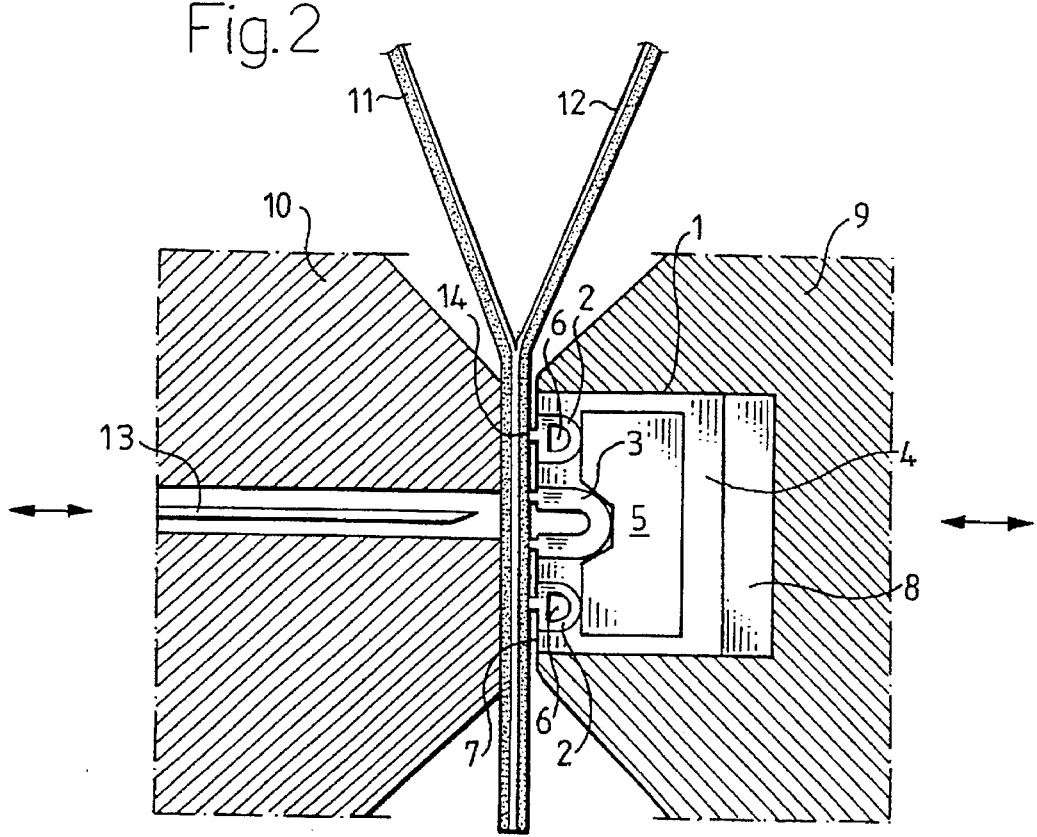

An inductor 1 according to the invention is shown in FIG. 1. The inductor 1 displays three substantially parallel conductors 2, 3 which are disposed in an electrically insulating carrier layer 4 which, in its interior, houses a core 5 of a ferrite material. The core 5 of ferrite material is insulated from the three conductors 2, 3. Both of the outer conductors 2 display a gently rounded cross section or alternatively a square or rectangular cross section. Both of the outer conductors 2 accommodate cooling ducts 6 in their interior, these being intended for coolant. The central conductor 3 is of substantially U-shaped appearance. Each conductor displays, on its upper surface 7, a bead or ridge 14 which projects above the surrounding surface 7 a distance of approx. 0.3 mm.

The three conductors 2 and 3 are preferably connected in parallel to a high frequency alternating current source (not shown). In such instance, a considerably higher current force will be obtained in the central conductor 3, but because of the configuration of the central conductor 3 (with the upwardly open U), an inductor 1 will be obtained in which conductors 2, 3 have approximately the same current density on the upper surface 7.

An inductor 1 according to the present invention may also be connected in series or inductively by means of a capacitor.

The inductor 1 is reinforced by a steel body 8 and the entire inductor 1 is disposed in a sealing jaw 9 to which may be imparted the desired sealing movement and which may exert the desired sealing pressure. The sealing jaw 9 is operative to move towards a likewise movable counter jaw 10. The packaging material 11 which is intended to be transversely sealed is advanced between the sealing jaw 9 and the counter jaw 10. The packaging material 11 is disposed between the two jaws 9 and 10 such that two thermoplastic layers 12 which are intended to be fused or sealed together are oriented towards one another.

When the two sealing jaws 9 and 10 move towards one another and there entrap between them the packaging material 11 which is to be transversely sealed, a seal will be created in three substantially parallel sealing lines wherein the centremost is of largest extent. When the two sealing jaws 9 and 10 are urged towards one another, the ridges 14 disposed on the conductors will locally exert a slightly greater compressive force and will contribute in creating a more reliable and tighter sealing of the packaging material 11. The packaging material 11 is intended to be severed in the centremost sealing joint or seam, in that a knife 13 disposed in the movable counter jaw 10 moves down through the material 11 into the U-shaped groove of the central conductor 3.

After transverse sealing employing an inductor 1 according to the present invention, any possible product residues will be enclosed between the transverse seal of the outer conductors 2 and the transverse seal of the central conductor 3. In such instance any possible product residues will be enclosed in a material which is just as aseptic as the remainder of the package and will not constitute any obstacle to the filling of products containing, for example, fibres, fruit seeds or kernels into the containers. The package severed in the central sealing joint or seam will not display any sealing fin where product residues may gather.

As has been apparent from the foregoing description, the present invention realizes an apparatus for transverse sealing of packaging blanks in which no sealing fin or flap is created on severing of the packaging blanks to form individual packages. In this instance, a transverse seal will here be obtained which is well suited in the filling of contents of high viscosity or contents which contain particles such as fruit seeds, kernels or fibres.

The present invention should not be considered as restricted to that described above and shown on the Drawing, many modifications being conceivable without departing from the spirit and scope of the appended claims.

What is claimed is:

1. An apparatus for sealing a thermoplastic-coated packaging material, the material having at least one layer of a metal foil, the apparatus comprising:

an inductor having at least three substantially parallel, spaced apart conductors, a center one of the three conductors being substantially U-shaped with two sealing edges and a groove therebetween facing outwardly from the inductor; and means for cutting packaging material, the cutting means and the inductor defining a gap, the packaging material extending through the gap, the cutting means having a cutting blade having a cutting edge disposed on an opposite side of the packaging material from the groove and means for moving the cutting blade, the cutting blade being movable relative to the inductor by the moving means such that at least part of cutting edge is received in the groove when the cutting means cuts the packaging material and as the three conductors form four seals in the packaging material and such that the cutting means cuts the packaging material to form a double seal on opposite sides of a cut formed by the cutting means, a thickness of the part of the cutting blade substantially corresponding to a width of the groove such that sides of the cutting blade are substantially adjacent interior walls of the groove when the cutting edge is received in the groove.

2. The apparatus claimed in claim 1, wherein the conductors are connected in parallel.

3. The apparatus claimed in claim 1, wherein the conductors are connected in series.

4. The apparatus claimed in claim 1, wherein the conductors are inductively connected to one another.

5. The apparatus claimed in claim 4, wherein the conductors are inductively connected by a capacitor.

6. The apparatus as claimed in claim 1, further comprising a sealing jaw and a counter jaw, the sealing jaw being movable toward and away from the counter jaw, the sealing jaw and the counter jaw receiving the material therebetween, the inductor being disposed in the sealing jaw.

7. The apparatus as claimed in claim 1, wherein the conductors include longitudinally projecting ridges projecting above a surface of the inductor, a compression force against the material being locally increased in a vicinity of the ridges.

8. The apparatus as claimed in claim 7, wherein the ridges project approximately 0.3 mm above the surface of the inductor.

9. The apparatus as set forth in claim 1, wherein a current density in each of the conductors is approximately equal.

10. The apparatus as set forth in claim 1, wherein the inductor further comprises a core of a magnetic material and an electrically insulating carrier portion.

11. An apparatus for sealing together facing thermoplastic surfaces of thermoplastic-coated packaging material, the material having at least one layer of a metal foil, the apparatus comprising:

an inductor having at least three substantially parallel, spaced-apart conductors, a center one of the three conductors being substantially U-shaped with a groove defined by two legs, each of the legs having a sealing edge, facing outwardly from the inductor;

a sealing jaw, the inductor being disposed in the sealing jaw;

a counter jaw, the packaging material being received between the sealing jaw and the counter jaw;

means for moving at least one of the sealing jaw and the counter jaw such that the sealing jaw and the counter jaw are disposed substantially adjacent to each other, the inductors forming four seals in packaging material disposed between the sealing jaw and the counter jaw when the sealing jaw and the counter jaw are disposed substantially adjacent to each other; and further comprising cutting means for cutting through the packaging material between a center two of the seals formed by the legs of the center one of the three conductors as the seals are formed, the cutting means including a cutting blade and second means for moving the cutting blade at the same time that the inductors form four seals in the packaging material, the cutting blade being movable relative to the sealing jaw by the second moving means and being at least partially receivable between the legs of the center one of the three conductors when the sealing jaw and the counter jaw are disposed substantially adjacent to each other, the cutting blade having a thickness substantially corresponding to a width of the groove such that sides of the cutting blade are substantially adjacent interior walls of the groove when the cutting blade is at least partially received in the groove.

12. The apparatus as set forth in claim 11, wherein the conductors include longitudinally projecting ridges projecting above a surface of the inductor, a compression force against the packaging material being locally increased in a vicinity of the ridges.

13. The apparatus as set forth in claim 11, wherein the cutting blade is at least partially disposed in the counter jaw.

14. The apparatus as set forth in claim 13, wherein the cutting blade is movable relative to the counter jaw.

* * * * *